(12) United States Patent
Chang et al.

(10) Patent No.: US 8,112,507 B2
(45) Date of Patent: Feb. 7, 2012

(54) REMOTE NODE LIST SEARCHING MECHANISM FOR STORAGE TASK SCHEDULING

(75) Inventors: Nai-Chih Chang, Shrewsbury, MA (US); Pak-lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 1430 days.

(21) Appl. No.: 11/237,453

(22) Filed: Sep. 27, 2005

(65) Prior Publication Data

US 2007/0073857 A1    Mar. 29, 2007

(51) Int. Cl.
*G06F 15/173* (2006.01)
*G06F 9/46* (2006.01)
(52) U.S. Cl. .................. 709/223; 718/100; 718/102
(58) Field of Classification Search .......... 709/223; 718/102, 100; 710/62; 713/300
See application file for complete search history.

(56) References Cited

U.S. PATENT DOCUMENTS

| | | | | |
|---|---|---|---|---|
| 6,434,590 | B1 * | 8/2002 | Blelloch et al. | 718/102 |
| 2003/0021239 | A1 * | 1/2003 | Mullendore et al. | 370/276 |
| 2003/0191793 | A1 * | 10/2003 | Dolin et al. | 709/103 |
| 2004/0172631 | A1 * | 9/2004 | Howard | 718/100 |
| 2005/0149927 | A1 * | 7/2005 | Abe | 718/100 |
| 2005/0216775 | A1 * | 9/2005 | Inoue | 713/300 |
| 2007/0006235 | A1 * | 1/2007 | Chang et al. | 718/102 |

OTHER PUBLICATIONS

Ghose et al., "A universal approach for task scheduling for distributed memory multiprocessors", 1994, IEEE, Paper appears in "Scalable High-Performance Computing Conference, 1994" p. 577-584.*
Zhang et al., "An Internet based distributed system by using real-time CORBA", 2003, IEEE, Paper appears in "Electrical and Computer Engineering, 2003. IEEE CCECE", vol. 2, p. 1263-1266.*
Guo et al., "An Efficient Packet Scheduling Algorithm in Network Processors", Mar. 2005, INFOCOM, Paper appears in "This paper appears in: INFOCOM 2005. 24th Annual Joint Conference of the IEEE Computer and Communications Societies", vol. 2, p. 807-818.*

* cited by examiner

*Primary Examiner* — Jeffrey R Swearingen
*Assistant Examiner* — Taylor Elfervig
(74) *Attorney, Agent, or Firm* — Christopher K. Gagne

(57) ABSTRACT

According to one embodiment, a device is disclosed. The device includes a first protocol engine (PE) to process tasks to be forwarded to a first remote node, a remote node search unit (RNSU) having a three-dimensional (3-D) task list corresponding to tasks to be forwarded to the two or more sub-nodes, and a connection pointer to maintain a connection between the first PE and the first remote node.

10 Claims, 5 Drawing Sheets

REMOTE NODE LIST SEARCHING MECHANISM FOR STORAGE TASK SCHEDULING

FIELD OF THE INVENTION

The present invention relates to computer systems; more particularly, the present invention relates to computer system interaction with storage systems.

BACKGROUND

Serial attached storage protocols, such as serial ATA (SATA) and serial Small Computer System Interface (SCSI) (SAS) are becoming more prevalent for connecting storage devices to a computer system. In computer systems implementing such serial storage devices, one storage device in the system may communicate with others. For example, a device requesting data (referred to as the initiator device) may receive data from a target device.

Task scheduling is a critical factor for providing efficient input/output (I/O) performance in complex server storage systems. For instance, tasks may include new commands, XFER_RDY frames, data, data sequence, response frames, primitives, or anything that needs to be processed. Task scheduling includes searching a next remote node (from a remote node list) to service, and searching a next task (from task list) to schedule within a remote node. Traditional mechanisms for how to assign those tasks to different remote nodes has become very complex in large storage systems.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A remote node list searching mechanism for storage task scheduling is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
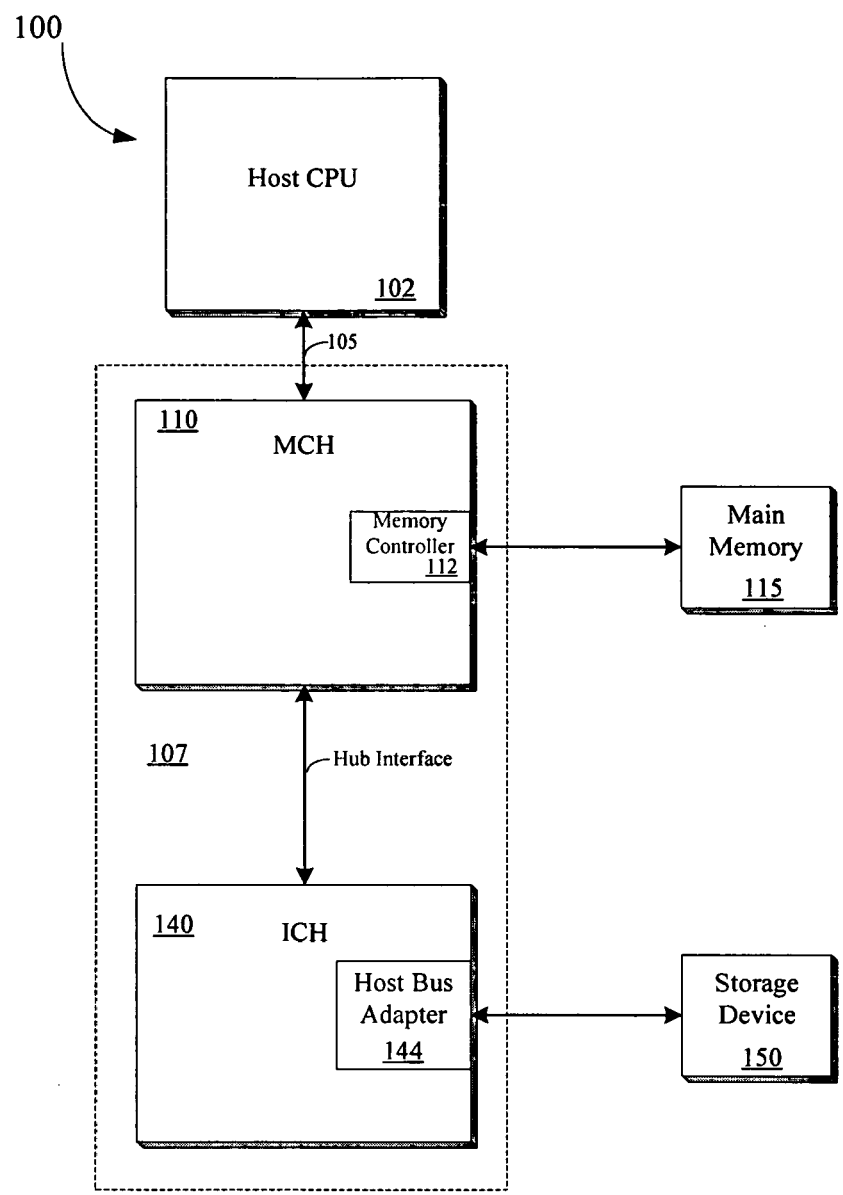
FIG. 1 is a block diagram of one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented using multiple processing cores. In other embodiments, computer system 100 may include multiple CPUs 102

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, ICH 140 includes a host bus adapter (HBA) 144. HBA 144 serves as a controller implemented to control access to one or more hard storage devices 150. In such an embodiment, HBA 144 operates as a serial attached SCSI (SAS) device coupled to one or more additional SAS devices. In a further embodiment, hard disk drive 150 is a serial SCSI (SSP) drive. However in other embodiments, storage device 150 may be implemented using other serial protocols.

Figure 2:
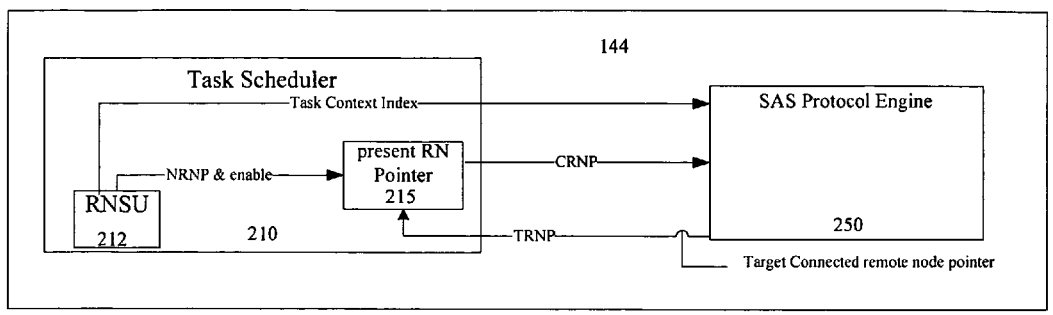
FIG. 2 illustrates one embodiment of an host bus adapter.

FIG. 2 illustrates one embodiment of HBA 144 implementing a SAS narrow port application. HBA 144 includes a task scheduler 210 and a SAS protocol engine 250. Task scheduler 210 schedules tasks to be processed at protocol engine 250. Task scheduler 210 includes a remote node searching unit (RNSU) 212 and present remote node (RN) pointer 215. RNSU 212 includes a next RN finder that searches for the next node that includes a task to be serviced by protocol engine 250, while present RN pointer 215 indicates the present node being processed.

Figure 3:
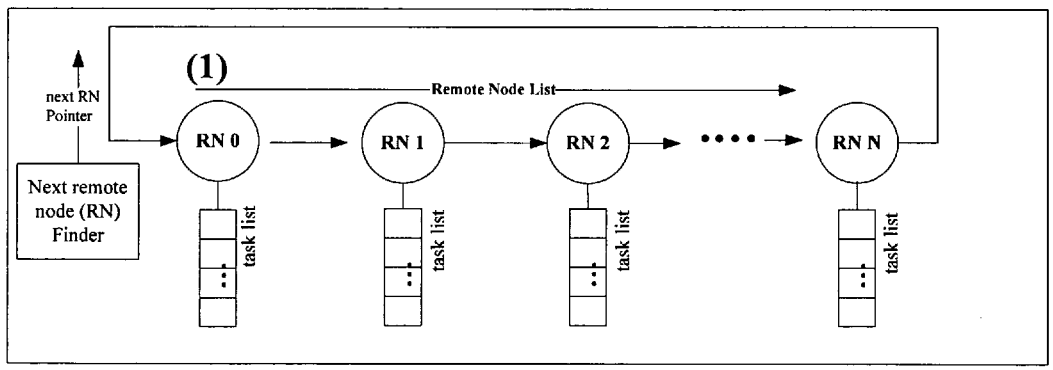
FIG. 3 illustrates an exemplary remote note searching unit.

In conventional systems, RNSU 212 implements a round robin or weighted round robin search mechanism. FIG. 3 illustrates one embodiment of a RNSU implementing a remote node searching round robin algorithm. In this example, the task scheduler first services Remote Node 0 (RN0) and then finds the next RN pointer from the remote node list and sets the next pointer to RN1. Once the task scheduler is done with servicing RN0, RN1 may begin processing based on the next pointer. Subsequently, the task scheduler finds RN2 and sends it to the next pointer, and so on.

The same steps are repeated as described above in a round robin fashion. Note that, when the task scheduler goes to the next remote node and finds tasks to issue to the protocol engine, the next remote node pointer (NRNP) should be saved as a present remote node pointer (PRNP) and be used for establishing connection. Whenever the connection is established, the task scheduler assigns tasks via sending task context index to the protocol engine.

In addition, when a target connects to the protocol engine, the target connected remote node pointer should be sent to the PRNP. Further, when the task scheduler changes remote node to service in SAS, a connection management unit (not shown) closes the connection on a previous remote node (or the connection is closed by the target) and opens a connection to the next remote node.

Figure 4:
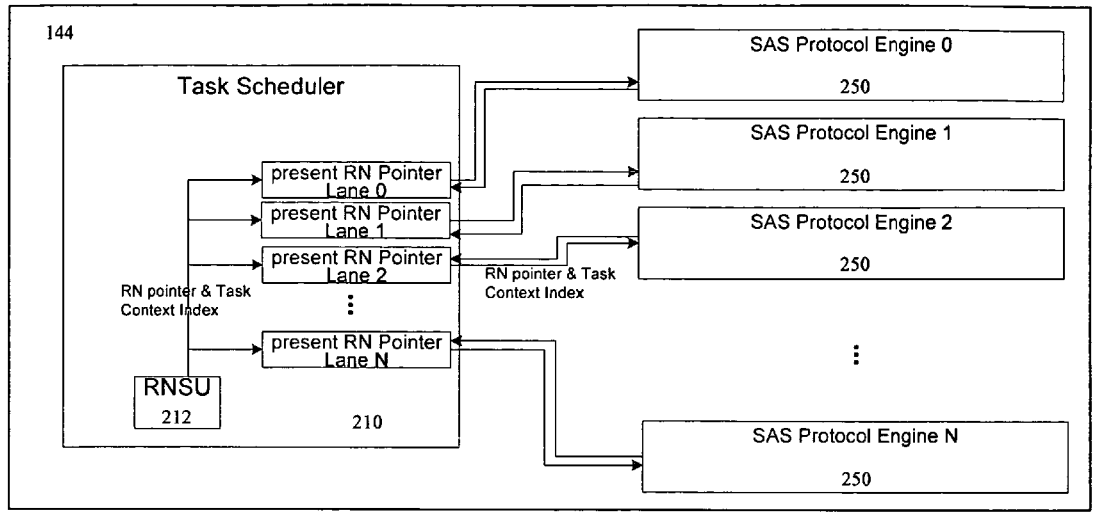
FIG. 4 illustrates another embodiment of a host bus adapter.

FIG. 4 illustrates another embodiment of HBA 144 implementing a SAS wide port configuration. In the wide port configuration, one task scheduler services multiple protocol engines at each port. The task scheduling procedure operates for the SAS wide port application in a manner similar to that of the narrow port application. In addition to the normal procedure defined in narrow port, the task scheduler finds the next available link (e.g., protocol engine or link layer) to assign tasks within a wide port configuration. Further, the task scheduler services many remote nodes (depending on a number of lanes in the wide port) simultaneously if necessary.

The above-described round-robin mechanism has limitations. For instance, for multiple remote nodes (devices) attached behind a single remote node (device) (e.g., multiple devices attached behind a STP/SATA bridge through SATA port multiplier in a SAS domain, multiple logical units included in a single SAS device (all of those logic units share the same SAS address), or public devices in Fibre Channel Switch through FL_port), the normal round robin remote node searching mechanism is inefficient at task scheduling for such device sub-unit configurations.

Figure 5:
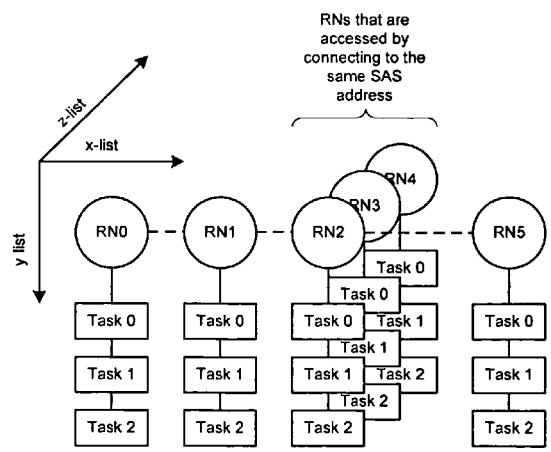
FIG. 5 illustrates one embodiment of a three-dimensional task list.

According to one embodiment, RNSU 212 implements a three-dimensional (3-D), remote node list to enable device sub-unit configuration task scheduling. FIG. 5 illustrates one embodiment of a three-dimensional task list. The PRNP Pointer described above includes one remote node at a time. When the 3-D list (RN2-RN4) is selected by RNSU 212, the PRNP is updated each time the service of the remote node within the 3-D list is completed.

Updating the PRNP each time a remote node in the 3-D list is serviced would result in connection, close and re-open. However, in this 3-D scenario the connection could be kept open due to the fact that all of those sub-devices behind a single device have the same SAS address and their task lists are not empty. Thus, there is no need to close the connection on the 3-D list until either no tasks are left or the target device closes the connection.

Figure 6:
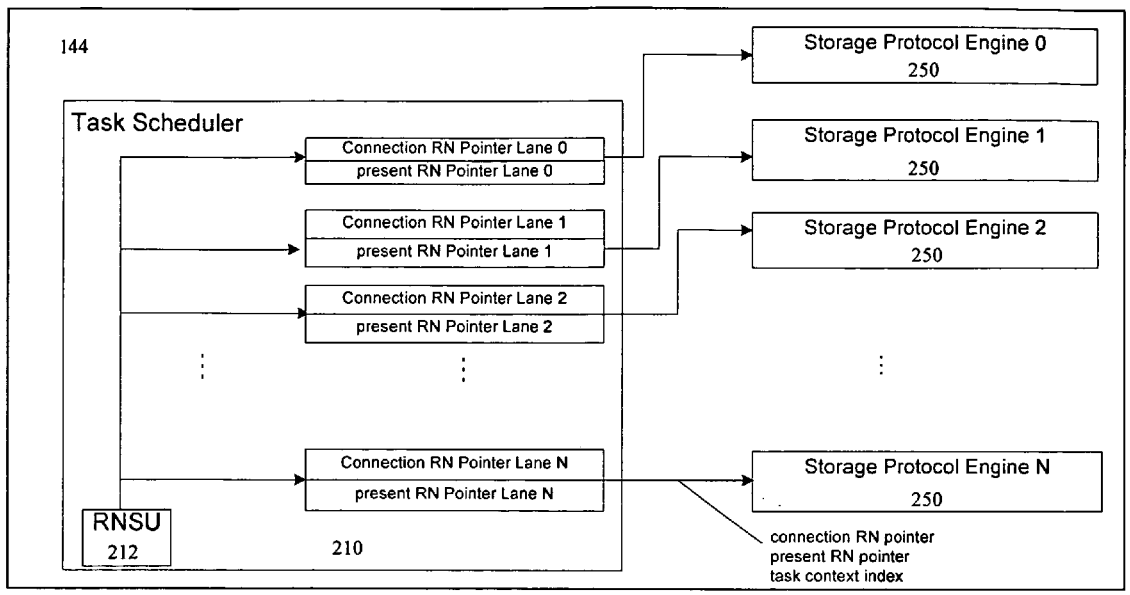
FIG. 6 illustrates another embodiment of a host bus adapter.

According to one embodiment, a connection remote node pointer is included within task scheduler 210 to service a 3-D device sub-unit configuration. FIG. 6 illustrates one embodiment of a HBA 144 where task scheduler 210 includes a connection remote node pointer (CRNP) associated with each lane in a port.

Figure 7:
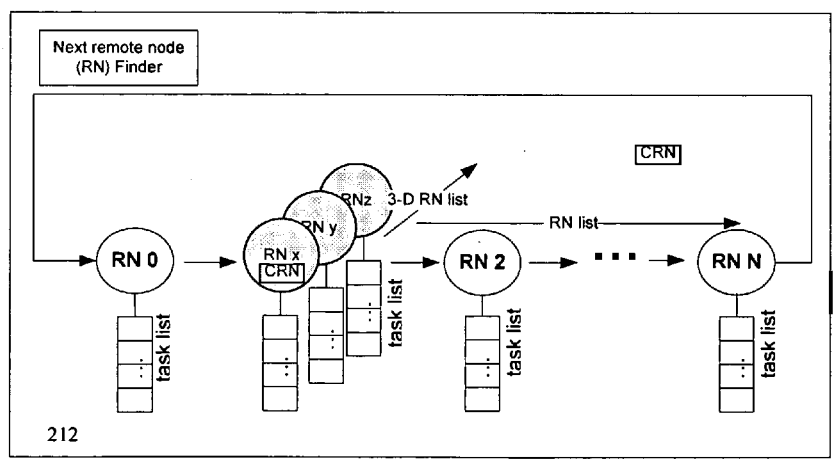
FIG. 7 illustrates one embodiment of a remote note searching unit.

FIG. 7 illustrates one embodiment of RNSU incorporating a CRN pointer for node searching. As shown in FIG. 7, Remote Node y (RNy) and RNz are attached behind RNx wherein each node has the same SAS address. When a connection is established to RNx, RNx is forwarded to the CRN pointer and to the present RN pointer if RNx has tasks to schedule. When the RNx task list is empty and the RNy or RNz remote nodes have tasks, the next remote node finder at RNSU 212 sends RNy or RNz to the CRN pointer and permits protocol engine 250 to perform its normal task processing routine.

In one embodiment, there is no connection closure involved in this case when task scheduler 210 switches remote nodes for servicing. As long as the CRN pointer remains the same there is no need to close the connection. In a further embodiment, the next RN finder can continue searching the normal remote node list, finding the next remote node to service and sending the next remote node to the next available link or protocol engine 250.

In yet a further embodiment, RNSU 212 keeps track of the last remote node serviced in each remote node list (e.g., normal RN list or 3-D RN list) so that RNSU 212 can continue on the remote node searching based on the previous remote node to achieve fair fashion of remote node selection.

However, in other embodiments where a target device connects a remote node that is not the consecutive remote node from the previous RN, the target connected remote node may be serviced again when the next RN finder goes through the same remote node in the RN list. According to one embodiment, each remote node includes a "serviced" bit to indicate whether the node has recently been serviced.

Figure 8:
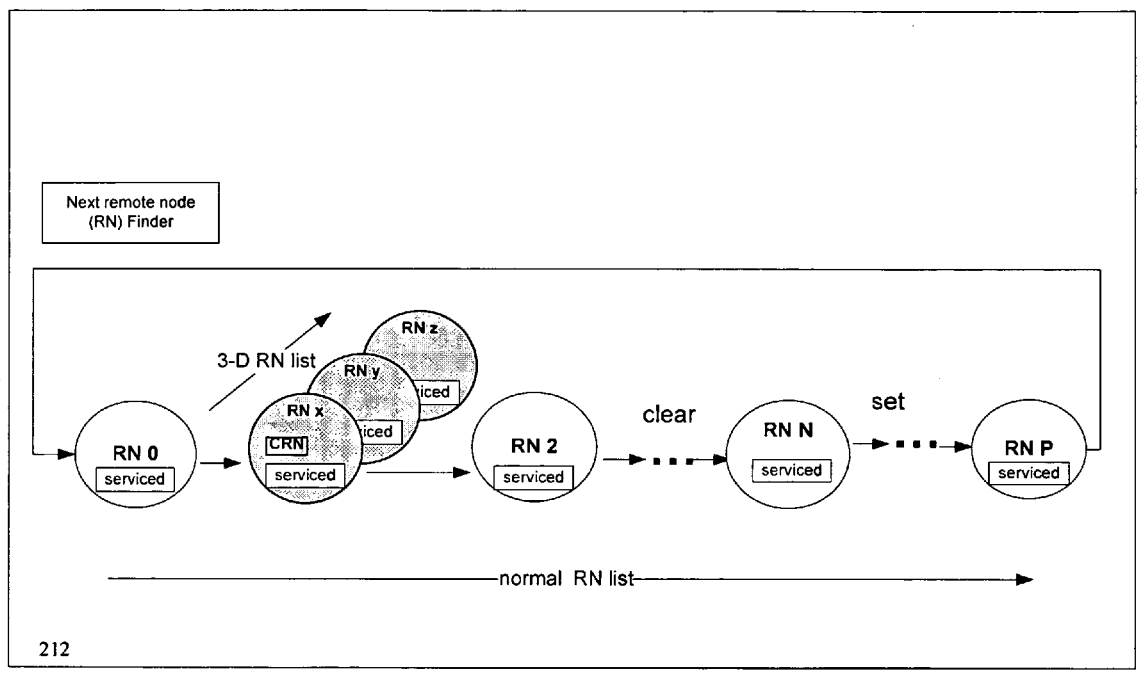
FIG. 8 illustrates another embodiment of a remote note searching unit.

FIG. 8 illustrates one embodiment of RNSU 212 implementing a serviced bit. Referring to FIG. 8, a target connected remote node may be marked 'serviced' when the connection is closed. When the next RN finder finds the remote node with the serviced bit asserted, the next RN finder will skip that remote node and find the next one.

In one embodiment, when the next RN finder skips the serviced remote nodes, the next RN finder should reset the service bit in those remote nodes so that they may be serviced later on. Note that, this can be considered as a two level service list where the first level list includes the normal remote nodes and the second level list includes those remote nodes connected by the target devices. The next RN finder will operate on the first level service list. The remote nodes on the second level can be promoted back to the first level once they are skipped by the next RN finder.

The above-described remote node list searching mechanism provides a scalable and high-performance remote node searching design for task scheduling that can be used in a wide range of storage configurations (e.g. SAS, SATA and Fibre Channel). Further, the mechanism eliminates connection closure overhead on device sub-unit configurations and improves overall I/O performance.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A device comprising:
a first protocol engine (PE) to process tasks to be forwarded to a first remote node in a network that includes a plurality of remote nodes, the plurality of remote nodes including the first remote node and another remote node, the first remote node being a bridge and having two or more attached sub-nodes, the first remote node and the sub-nodes each having an identical serial attached storage (SAS) protocol address, the sub-nodes being attached behind the first remote node in the network;
a remote node search unit (RNSU) having a three-dimensional (3-D) task list corresponding to tasks to be forwarded to the plurality of remote nodes, respective remote nodes in the plurality of remote nodes having different respective SAS protocol addresses, the tasks in the list to be forwarded to the respective remote nodes using the different respective SAS protocol addresses; and a connection pointer to be assigned the different respective SAS protocol addresses to open different respective connections between the respective remote nodes and the first PE, the connection pointer to be assigned the identical SAS protocol address of the first remote node and the sub-nodes in such a way as to permit the connection pointer to be used to keep open a connection between the first PE and the first remote node until the following occurrence: no tasks remain in the three-dimensional task list that are for the first remote node and the two or more sub-nodes;

the connection pointer to be assigned another one of the different respective SAS addresses to open another connection with the another remote node after the occurrence;

the RNSU also including a bit to be set after closing of the connection between the first PE and the first remote node to indicate that a subsequent servicing of one or more tasks in the task list is to be deferred, the bit to be reset after deferral of the subsequent servicing.

2. The device of claim 1 wherein the connection between the first PE and the first remote node is prevented from closing as long as a connection pointer value is unchanged.

3. The device of claim 2 wherein the connection pointer value is unchanged when a task from a second sub-node list is to be forwarded to a second remote node via the first remote node immediately after a task from a first sub-node list is forwarded to the first remote node.

4. The device of claim 3 further comprising a first present remote node pointer associated with the first PE.

5. The device of claim 3 further comprising a second PE coupled to the RNSU to process tasks to be forwarded to a second remote node.

6. The device of claim 5 wherein the connection pointer value is changed when a task from the second remote node list is to be forwarded to the second remote node immediately after a task from the first remote node list is forwarded to the first remote node.

7. The device of claim 2 further comprising a sub-node search unit (SNSU) to search for a next sub-node.

8. A method comprising:
transmitting a first task from a host device to a first sub-node of a first remote node;
maintaining an open connection to the first remote node if a connection pointer indicates that a second task is to be forwarded to a second sub-node of the first remote node;
transmitting the second task from the host device to the second sub-node, the first remote node being in a network that includes a plurality of remote nodes, the plurality of remote nodes including the first remote node and another remote node, the first remote node being a bridge and having the first sub-node and the second sub-node attached behind the first remote node in the network, the first remote node and the sub-nodes each having an identical serial attached storage (SAS) protocol address;
using the connection pointer to open respective connections to each of the plurality of remote nodes, respective remote nodes in the plurality of remote nodes having different respective SAS protocol addresses, the respective connections to be opened to permit tasks in a three-dimensional task list to be forwarded to the respective remote nodes using the different respective SAS protocol addresses, the connection pointer to be assigned the identical SAS protocol address of the first remote node and the sub-nodes in such a way as to permit the connection pointer to be used to keep open the respective connection between the host device and the first remote node until the following occurrence: no tasks remain in the three-dimensional task list that are for the first remote node and the sub-nodes;
changing the connection pointer by assigning another respective one of the different respective SAS protocol addresses to the connection pointer to open another connection with the another remote node in the plurality of remote nodes after the occurrence; and
setting a bit after closing of the respective connection with the first remote node to indicate that a subsequent servicing of one or more tasks is to be deferred, the bit to be reset after deferral of the subsequent servicing.

9. The method of claim 8 further comprising closing the connection to the first remote node if the connection pointer indicates that second next task is to be forwarded to a second remote node.

10. The method of claim 9 further comprising changing a connection pointer value if the next task is to be forwarded to a second remote node.

* * * * *